United States Patent [19]

Kohno et al.

[11] Patent Number: 4,699,310
[45] Date of Patent: Oct. 13, 1987

[54] METHOD OF BONDING ALUMINA TO METAL

[75] Inventors: Akiomi Kohno, Niihari; Hideo Nakae, Tokyo; Akihiko Yamamoto, Niihari; Hiroyuki Kawamoto, Hitachi, all of Japan

[73] Assignee: Hitachi, Ltd., Tokyo, Japan

[21] Appl. No.: 895,690

[22] Filed: Aug. 12, 1986

Related U.S. Application Data

[63] Continuation of Ser. No. 654,458, Sep. 26, 1984.

[30] Foreign Application Priority Data

Sep. 28, 1983 [JP] Japan .................................. 58-177933

[51] Int. Cl.4 ............................................. B23K 31/02
[52] U.S. Cl. .................................. 228/122; 228/124; 228/234; 228/263.12
[58] Field of Search ............... 228/121, 122, 123, 124, 228/233, 238, 263.12, 263.15, 263.16

[56] References Cited

U.S. PATENT DOCUMENTS

| | | | |
|---|---|---|---|
| 3,513,535 | 5/1970 | Clarke | 228/238 |
| 3,893,224 | 7/1975 | Besson | 228/124 |
| 4,516,715 | 5/1985 | Sugimori | 228/263.16 |
| 4,552,301 | 11/1985 | Liehr | 228/263.12 |
| 4,580,714 | 4/1986 | Mayer | 228/121 |
| 4,596,354 | 6/1986 | Moorhead | 228/122 |
| 4,602,731 | 7/1986 | Dockus | 228/122 |

Primary Examiner—Kurt Rowan
Attorney, Agent, or Firm—Antonelli, Terry & Wands

[57] ABSTRACT

A method of bonding alumina to a metal characterized in that an aluminum or aluminum-base alloy sheet is inserted between the alumina and the metal when they are bonded together by being heated and pressed, thereby obtaining a product which has a high reliability in strength at the joint and a high dimensional accuracy.

8 Claims, 3 Drawing Figures

METHOD OF BONDING ALUMINA TO METAL

This is a continuation of application Ser. No. 654,458, filed Sept. 26, 1984.

BACKGROUND OF THE INVENTION

1. FIELD OF THE INVENTION

The present invention relates to a method of bonding alumina to a metal and, more particularly, to a method of bonding alumina to a metal which method is suitable for use in producing, for example, a mechanical structural element or an electronic element in which alumina and a metal must be bonded together at a temperature as low as possible.

2. DESCRIPTION OF THE PRIOR ART

A method of the prior art for bonding alumina and a metal is described in the specification of British Pat. No. 761,045. The method comprises the steps of: applying or forming on at least one of the surfaces of the material to be bonded a film or skin of cuprous oxide ($Cu_2O$); positioning the material to be bonded so that the surfaces thereof to be bonded are in contacting relation; and heating the assembly to a temperature between the melting point of copper (1083° C.) and the melting point of cuprous oxide (1235° C.) so as to achieve the bonding thereof through the reaction between the cuprous oxide, molten copper and substrate.

According to the above-described method, however, it is necessary to effect heating at a high temperature, lower than 1,230° C., which heating causes a thermal stress due to the difference in thermal expansion between alumina and a metal when they are cooling down after being bonded together. Therefore, the alumina is easily cracked, resulting disadvantageously in a lowering of reliability in strength. Further, the metal may be thermally deformed on heating, causing the dimensional accuracy of a product to be deteriorated.

SUMMARY OF THE INVENTION

Object of the Invention

An object of the invention is to provide a method of bonding alumina to a metal wherein the thermal stress which is caused when the alumina and the metal are cooling down after being bonded together is minimized by lowering the bonding temperature as much as possible, and consequently the alumina is hardly cracked at all, thereby allowing its reliability in strength to be improved.

Another object of the invention is to provide a method of bonding alumina to a metal wherein the thermal deformation of the metal is suppressed by lowering the bonding temperature as much as possible, thereby allowing a product having a high dimensional accuracy to be obtained.

BRIEF SUMMARY OF THE INVENTION

To these ends, the invention is characterized in that an aluminum or aluminum alloy sheet is inserted between alumina and a metal to be bonded together, and heating and applying of pressure are effected to achieve the bonding.

Further, according to the invention, a sheet of an aluminum-silicon alloy or a sheet which is constituted by a core sheet of an aluminum-base alloy and two skins of an aluminum-silicon alloy is employed as an interlayer between alumina and a metal, and the alumina and the metal are heated to a temperature above the solidus line of the aluminum-silicon alloy while being pressed.

These and other objects, features and advantages of the invention will become clear from the following description taken in conjunction with the accompanying drawings.

DETAILED DESCRIPTION OF THE INVENTION

Examples of the invention will be described hereinunder with reference to the accompanying drawings.

(1) Embodiment of bonding alumina ($Al_2O_3$) to steel (Fe)

EXAMPLE 1

Figure 1:
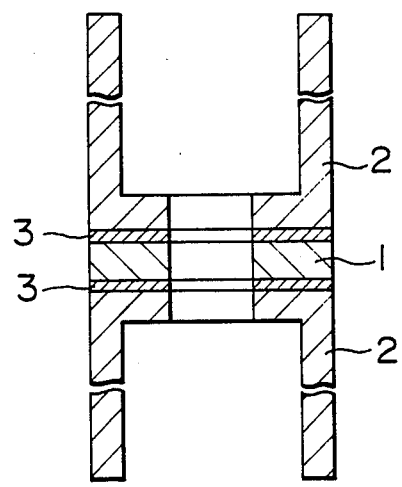
FIG. 1 is a sectional view of the joint between an alumina ring and steel pipes.
Figure 2:
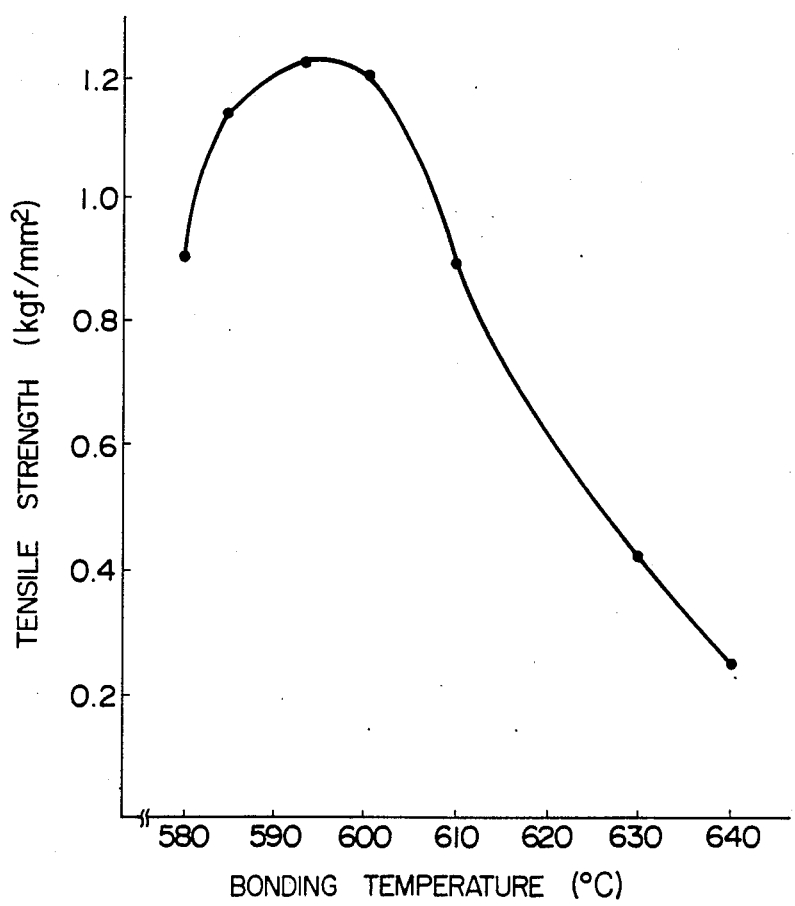
FIG. 2 is a graph showing an optimum temperature range for bonding alumina to steel.

As shown in FIG. 1, an alumina ring 1 was placed between two Fe pipes 2. A three-layer sheet 3 constituted by a core sheet of an Al-base alloy and two skins of an Al-Si-Mg alloy was inserted between the respective surfaces of the alumina ring 1 and each of the Fe pipes 2 to be bonded together. Then, these members to be bonded were heated at a bonding temperature of 600° C. for 15 minutes in a vacuum atmosphere ($10^{-4}$ Torr) while being held under a bonding pressure of 1.0 $Kgf/mm^2$. In this case, the Al-Si-Mg alloy as the skin constituting both the surfaces of the sheet 3 became molten at about 585° C., and therefore, the skin alloy containing Al and Si was bonded to the alumina constituting the ring 1. In the area between each sheet 3 and the corresponding Fe pipe 2, on the other hand, intermetallic compounds of Fe and Al were formed by diffusion of the Al of the molten alloy. FIG. 2 shows an optimum bonding temperature range (580° to 610° C.) in relation to alumina and Fe.

In the alumina ring 1 and the Fe pipes 2 thus bonded together, no crack at all was found in the alumina ring 1, since Al, which is low in bonding temperature as well as being soft, was employed as an interlayer, and consequently, the occurrence of thermal stress was minimized by the fact that Al is low in bonding temperature, and the thermal stress occurring was relieved by the fact that Al is soft. Moreover, there was observed no substantial difference between the dimension of the Fe pipe 2 measured before bonding and that measured after bonding. In other words, it was confirmed that the Fe pipe 2 was not thermally deformed. Moreover, it was possible to confirm from the He leakage test carried out on the joint between the alumina ring 1 and the Fe pipe 2 that the joint had an airtightness not greater than $10^{-8}$ Torrl/sec.

It is to be noted that Mg employed in this example is effective in improvement of the wetting properties of the molten Al-Si alloy with respect to alumina and Fe.

EXAMPLE 2

The members to be bonded shown in FIG. 1 were heated at a bonding temperature of 600° C. for 10 minutes in an argon atmosphere (1 atm.) while being held under a bonding pressure of 2 $Kgf/mm^2$. As a result, the alumina ring 1 and each of the Fe pipes 2 were bonded together while a portion of the Al-base alloy sheet 3 was protruded from the outer periphery of the joint. As the result of the He leakage test performed on the joint thus bonded, an airtightness not greater than $10^{-8}$ Torrl/sec. was confirmed. Further, it was possible to obtain a tensile strength of 1.1 Kgf/mm$^2$ and a bonding strength substantially similar to that obtained by bonding effected in a vacuum atmosphere.

EXAMPLE 3

With a pure Al sheet employed as the sheet 3 shown in FIG. 1, the members to be bonded shown in FIG. 1 were heated at a bonding temperature of 650° C. for 15 minutes in a vacuum atmosphere ($10^{-4}$ Torr) while being held under bonding pressure of 2 Kgf/mm$^2$. In this case, since the pure Al sheet 3 is plastically deformed by being pressed at high temperature, the oxide film ($Al_2O_3$) formed on the surface of the pure Al sheet 3 is destroyed, so that a clean metallic surface of Al came in contact with the alumina ring 1 and the Fe pipe 2. Accordingly, Al is diffused during the heating and pressing operation such as to perform a solid-phase reaction with alumina and Fe, thereby allowing the alumina and the Fe to be bonded together. Example 3 in which pure Al is employed as an insert differs from Example 1 in that both the bonding temperature and the bonding pressure in Example 3 are higher than those in Example 1. The joint, however, has a bonding strength and an airtightness measured by the He leakage test substantially equal to those in Example 1.

(2) Embodiment of bonding alumina to Al

EXAMPLE 1

Figure 3:
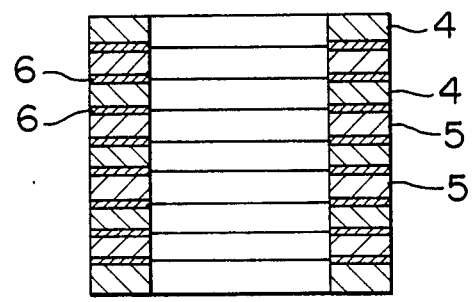
FIG. 3 is a sectional view of the joint between alumina sheets and aluminum sheets.

As shown in FIG. 3, alumina sheets 4 and Al sheets 5 were alternately laid one upon another. Between each alumina sheet 4 and the adjacent Al sheet 5 was interposed a three-layer sheet 6 constituted by a core sheet of an Al-base alloy and two skins of an Al-Si-Mg alloy. This assembly was bonded together in a vacuum atmosphere ($10^{-4}$ Torr) on heating at a bonding temperature of 600° C. for 15 minutes while holding the assembly under a bonding pressure of 0.2 Kgf/mm$^2$.

In this Example, it was confirmed that the Al sheets 5 were not thermally deformed, and no crack was found in the alumina sheets 4. Further, each joint was capable of possessing a tensile strength of as much as 3 Kgf/mm$^2$. In addition, an airtightness not greater than $10^{-8}$ Torrl/sec. was confirmed from the He leakage test.

EXAMPLE 2

In place of the sheet 6 shown in FIG. 3, Al-10% Si powder was interposed between each alumina sheet 4 and the adjacent Al sheet 5, and the assembly to be bonded was heated at a bonding temperature of 600° C. for 15 minutes in a vacuum atmosphere ($10^{-4}$ Torr) while being held under a bonding pressure of 0.2 Kgf/mm$^2$.

In this Example, it was also confirmed that it was possible to obtain a high dimensional accuracy and an excellent airtightness of not greater than $10^{-8}$ Torrl/sec. as measured by the He leakage test.

It is to be noted that alumina and Fe can be bonded together not only in a vacuum atmosphere or argon atmosphere but also in atmospheric air. In the case of bonding in atmospheric air, Fe is oxidized, but there will be no problem if bonding is effected on heating for a short period of time and under a strong bonding pressure.

As has been described above, the invention makes it possible to lower the temperature of bonding alumina and a metal to 660° C. or less and to bond the materials which are to be bonded in a single heating operation. Thus, the following advantageous effects are attained:

(1) A relatively low heating temperature reduces the thermal stress which is caused when alumina and a metal are cooling down after being bonded together, so that the alumina is hardly cracked. As a result, reliability in strength is improved.

(2) Since thermal deformation of the metal is suppressed, it is possible to obtain a product having a high dimensional accuracy.

What is claimed is:

1. A method of bonding a member made of alumina to another member made of a metal, comprising the steps of:

providing a sheet containing aluminum;
   interposing said sheet between said alumina member and said metal member so that the surface of the sheet is in contact with respect to the surfaces of the alumina member and the metal member; and
   keeping said sheet and the respective surfaces of said members in contact while heating to a temperature higher than the solidus line of said aluminum containing sheet and applying pressure to interfaces defined between said sheet and said members during said heating, wherein said sheet is a three-layer material having an aluminum containing core and two skins, each skin comprising an aluminum and silicon based alloy.

2. A method according to claim 1, wherein said core is composed of pure aluminum.

3. A method according to claim 1, wherein said core is composed of an aluminum based alloy.

4. A method according to claim 1, wheren the pressure applied to the interfaces is in such degree that the core is protruded from the outer periphery of said interface.

5. A method according to claim 1, wherein said another member is made of a metal selected from the group consisting of iron, steel and aluminum.

6. A method according to claim 1, wherein said said temperature is less than or equal to 660° C.

7. A method according to claim 1, wherein said temperature is in the range of from 580° C. to 610° C.

8. A method according to claim 1, wherein said pressure is in the range of from 0.2 to 2.0 Kgf/mm$^2$.

* * * * *